United States Patent [19]

Spinelli et al.

[11] Patent Number: 4,940,761
[45] Date of Patent: Jul. 10, 1990

[54] GROUP TRANSFER POLYMERIZATION OF GLYCIDYL (METH)ACRYLATE COPOLYMERS TO FORM OXIRANE GROUP-TERMINATED BLOCK COPOLYMERS

[75] Inventors: Harry J. Spinelli, Wilmington, Del.; Gordon M. Cohen, Wynnewood, Pa.

[73] Assignee: E. I. Du Pont de Nemours and Company, Wilmington, Del.

[21] Appl. No.: 274,462

[22] Filed: Nov. 21, 1988

Related U.S. Application Data

[60] Continuation-in-part of Ser. No. 008,958, Jan. 30, 1987, abandoned, which is a division of Ser. No. 868,083, May 29, 1986, abandoned.

[51] Int. Cl.$^5$ .................... C08F 24/00; C08F 224/00
[52] U.S. Cl. .................................. 526/273; 526/79; 526/190; 526/192; 526/214; 526/328.5; 525/195; 525/327.3; 525/330.6; 525/386

[58] Field of Search ............... 525/286, 299, 303, 308, 525/309, 195, 327.3, 330.6, 386; 526/79, 190, 192, 214, 273, 328.5

[56] References Cited

U.S. PATENT DOCUMENTS

| 4,388,448 | 6/1983 | Melby | 525/327.3 |
| 4,417,034 | 11/1983 | Webster | 526/190 |
| 4,524,196 | 6/1985 | Farnham et al. | 526/194 |

FOREIGN PATENT DOCUMENTS 59-213701  12/1984  Japan .................................. 525/286

Primary Examiner—John C. Bleutge
Assistant Examiner—Robert E. L. Sellers, II.
Attorney, Agent, or Firm—Charles J. Shoaf

[57] ABSTRACT

ABA triblock polymers that have glycidyl methacrylate as the A segments and (meth)acrylate monomers as the B segment are made by group transfer polymerization, using a monofunctional initiator to make the A, then AB segments. A coupling agent is used to connect the AB segments at the B group.

5 Claims, No Drawings

GROUP TRANSFER POLYMERIZATION OF GLYCIDYL (METH)ACRYLATE COPOLYMERS TO FORM OXIRANE GROUP-TERMINATED BLOCK COPOLYMERS

CROSS-REFERENCE TO RELATED APPLICATION

This is a continuation-in-part of application Ser. No. 07/008,958 filed Jan. 30, 1987, now abandoned, which is a division of application Ser. No. 06/868,083 filed May 29, 1986, now abandoned.

BACKGROUND

Epoxy resins are widely used today in surface coatings, adhesives, castings, laminates, and encapsulation of electronic parts. Most of these epoxy resins are prepared by the reaction of 2,2-bis(4'-hydroxyphenyl)propane [bisphenol A] and epichlorohydrin. This generates a polymer with a backbone composed of ether links between bisphenol A structures and hydroxy propylene moieties. There is also one epoxy group (oxirane) at each end of the polymer backbone. These resins can be cured by reacting their epoxy groups with crosslinking agents, such as anhydrides, amines, and acids. When cured, the epoxides have good tensile strengths, excellent electrical insulating properties, and have outstanding adhesion to many surfaces.

However a major weakness of these conventional epoxy resins is their poor outdoor durability. The ether links in their backbone as well as the aromatic rings lead to poor UV and oxidative stability. Because of this limitation, these epoxy resins cannot be used in systems that require long term outdoor exposure.

Previously two approaches have been taken to make durable epoxides. One involves the synthesis and use of low molecular weight cyclic or acyclic diepoxides and the other involves the synthesis and use of copolymers of glycidyl methacrylate (GMA). Both of these approaches, though they generate epoxides that are more durable than bisphenol A based resins, have significant deficiencies. The cyclic-type of epoxides are not polymers and have only a very low molecular weight segments binding the two epoxy groups. These materials tend not to have the superior physical properties of conventional epoxides. The systems based on random copolymers of GMA do not have the controlled placement of the epoxy groups. That is, these copolymers have the epoxy groups distributed randomly along the entire backbone of the methacrylate chain. The placement of the epoxy groups at the end of the polymer chain, as seen in bisphenol A epoxides, imparts important properties such as toughness. The random placement of the epoxy groups lowers final properties.

The bisphenol A-based epoxides are well known and are items of commerce (e.g., the Epon resins from Shell and the family of DER epoxides from Dow). The cyclic epoxides have also been commercially available (e.g. Union Carbide's ERL-4221, a cycloaliphatic diepoxide).

Methacrylate copolymers that use randomly distributed GMA have been used in the coatings industry (U.S. Pat. Nos. 3,817,946; 4,027,066; 3,730,930; 4,346,144). However, no patents or publications have been identified that report ABA triblock methacrylate polymers with GMA in the A segments.

The patents and publications concerning GTP report the ability to make block structure using that process (U.S. Pat. Nos. 4,417,034; 4,508,880; 4,414,372; 4,524,196; and 4,544,724). However none of these disclose the epoxy triblock structure nor the advantages of that structure as a durable epoxy resin.

Related applications include Ser. Nos. 660,588, now U.S. Pat. No. 4,711,942, and 660,589, now U.S. Pat. No. 4,581,428, filed Oct. 18, 1984; 673,926 filed Nov. 21, 1984, now U.S. Pat. No. 4,681,918; and 676,099 filed Nov. 29, 1984, now abandoned. Also, application Ser. No. 707,193, filed Mar. 1, 1985, now U.S. Pat. No. 4,588,795, which discloses and claims the use of certain types of oxyanion catalyst in group transfer polymerization.

The disclosures of the above-mentioned patents and applications are hereby incorporated by reference.

In the process of the invention, the polymer produced is "living" in that the polymerization is characterized by the presence, in the growing and in the grown polymer, of a moiety containing the aforesaid metal at "living" ends and the activating substituent or diradical, or a tautomer thereof, at "nonliving" ends of the polymer.

Monomers which are useful in group transfer polymerization herein are of the formula $CH_2=C(Y)X$ wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$; each $R^1$, independently, is H or a hydrocarbyl radical which is an aliphatic, alicyclic, aromatic or mixed aliphatic-aromatic radical containing up to 20 carbon atoms, provided that at least one $R^1$ group is not H;

R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula $-Z'-(O)C-C(Y^1)=CH_2$ wherein $Y^1$ is H or $CH_3$ and $Z'$ is O or $NR'$; and each of $R'$ and $R''$ is independently selected from $C_{1-4}$ alkyl.

The initiator used in the polymerization of this invention is a silicon-containing initiator of U.S. Pat. Nos. 4,414,372, 4,524,196, 4,417,034 and 4,508,880 supra, and copending application Ser. Nos. 660,588, 660,589, 673,926 and 676,099. Initiators which are preferred for use herein are of the formula selected from $(R^1)_3MZ$, $(R^1)_2M(Z^1)_2$ and $O[M(R^1)_2X^1]_2$ wherein:

$R^1$ is as defined above;

Z is an activating substituent selected from the group consisting of

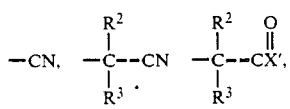

-continued

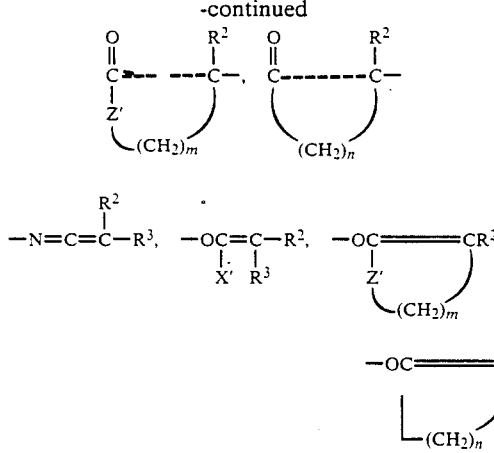

—SR, —OP(NR′R″)$_2$, —OP(OR$^1$)$_2$, —OP[OSi(R$^1$)$_3$]$_2$ and mixtures thereof wherein R, R$^1$, R′, R″, X′ and Z′ are as defined above;

Z$^1$ is the activating substituent

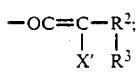

m is 2, 3 or 4;
n is 3, 4 or 5;
M is Si, Sn or Ge, provided, however, when Z is

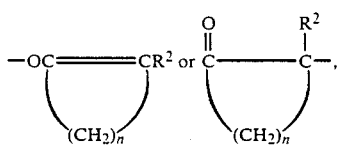

M is Sn or Ge; and each of R$^2$ and R$^3$ is independently selected from H and hydrocarbyl, defined as for R above;

(a) at least one of any R, R$^2$ and R$^3$ in the initiator optionally containing one or more initiating substituents of the formula —Z$^2$—M(R$^1$)$_3$ wherein M and R$^1$ are as defined above;

Z$^2$ is an activating diradical selected from the group consisting of

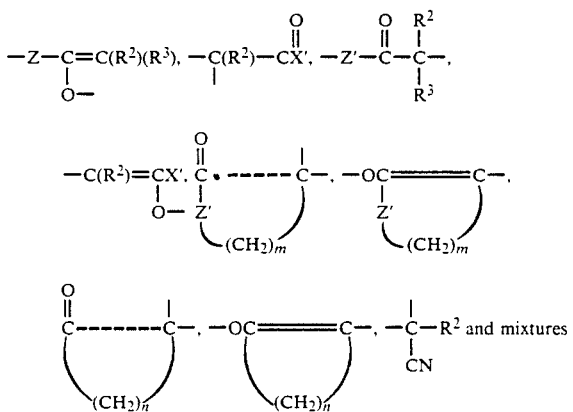

thereof, wherein R$^2$, R$^3$, X′, Z′, m and n are as defined above provided however when Z$^2$ is

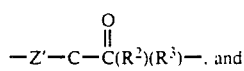

M is Sn or Ge,
(b) R$^2$ and R$^3$ taken together are

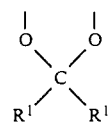

if Z is if Z is $-\underset{R^3}{\underset{|}{C}}-\overset{O}{\overset{||}{C}}X'$ or —OC=C(R$^2$)(R$^3$) and/or Z$^2$ is $$-Z'-C-\overset{O}{\overset{||}{C}}(R^3)-, \text{ and}$$

(c) X′ and either R$^2$ or R$^3$ taken together are

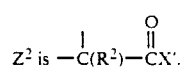

if Z is if Z is $\underset{R^3}{\underset{|}{C}}-\overset{O}{\overset{||}{C}}X'$ or —OC=C(R$^2$)(R$^3$) and/or $$Z^2 \text{ is } -\overset{|}{C}(R^2)-\overset{O}{\overset{||}{C}}X'.$$

The invention is concerned with ABA triblock polymers that have glycidyl methacrylate (GMA) as the A segments and standard (meth)acrylate monomers as the B segment. These methacrylate triblock polymers have now been synthesized with epoxy groups located only at the ends of the polymer chain. Because their backbone is a (meth)acrylate (meaning acrylate and/or methacrylate) structure, these epoxy resins should be significantly more durable than conventional bisphenol A based epoxides. These new polymers should have better final properties than the cyclic epoxies because the backbone is polymeric in nature. They should be better than conventional GMA polymers that have a random distribution of epoxy groups because all of the epoxy groups are now located at the end of the chains, similar to bisphenol A epoxies.

SUMMARY OF THE DISCLOSURE

A process for the preparation of an ABA block copolymer having a center segment between two end segments, each end segment being an oxirane-containing acrylic or methacrylic moiety, said center segment being an acrylic or methacrylic moiety not containing oxirane groups By reacting the ingredients by group transfer polymerization techniques.

The invention is concerned with the preparation of ABA triblock polymers that have glycidyl (meth)acrylate (GMA or GA) as the A segments and standard (meth)acrylate monomers as the B segment. These methacrylate triblock polymers have now been synthesized with epoxy groups located only at the ends of the polymer chain. Because their backbone is a (meth)acrylate structure, these epoxy resins should be significantly more durable than conventional bisphenol A based epoxides. These new polymers should have better final properties than the cyclic epoxides because the backbone is polymeric in nature. They should be better than conventional GMA polymers that have a random distribution of epoxy groups because all of the epoxy groups are now located at the end of the chains, similar to bisphenol A epoxides.

DETAILED DESCRIPTION

There are at least four major approaches to making ABA polymers according to the invention. They are: (1) start with a monofunctional initiator and polymerize in three steps GMA first which makes the first A segment, followed by methyl methacrylate (MMA) which adds onto the A segment and makes an AB polymer), and finally GMA again which completes the ABA structure; (2) start with a difunctional initiator and polymerize the monomers in two steps MMA first which creates the middle B segment, followed by GMA which will add onto both ends simultaneously because of the difunctional initiator—making the ABA polymer; (3) start with monofunctional initiator, polymerize in two steps (GMA first—making the A segment followed by MMA—making an AB polymer), and finally couple the polymer (this unites the two AB polymers at the B end and creates an ABA polymer; (4) start with an epoxy containing initiator, the A segment, polymerize the MMA, making an AB polymer, and finally couple the polymer which unites the two AB polymers at the B end and creates an ABA polymer.

Monomers which can be used to prepare the center section include, for example, alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isoropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate, blocked (meth)acrylic acid monomers which can be unblocked after polymerization, including trimethyl silyl methacrylate and 1-butoxy ethyl methacrylate, and the like. Both the end and center sections can include other functionality, such as for crosslinking, so long as it does not interfer with polymerization.

Examples 1 to 4 describe (1) how GMA//MMA//GMA epoxy resins were made using a monofunctional initiator and three monomer feed process. Examples 5 to 11 describe (2) how GMA//BMA//GMA resins were made using difunctional initiator and two monomer feed process. Example 12 describes (3) how one might make GMA//BMA//GMA using monofunctional initiator, two monomer feeds, and a coupling agent. Example 13 describes (4) how one might make GMA//MMA//GMA using an epoxy initiator, a monomer feed, and a coupling agent. The coupling agent is preferably diphenyl terephthalate, but it could be other suitable materials.

EXAMPLE 1 (GMA//MMA//GMA 3//10//3)

(Mono-initiator, 3-feed)

A 250 ml round bottom flask, equipped with a mechanical stirrer, thermometer, and nitrogen inlet, is charged with tetrahydrofuran THF (75.0 gm), 1-trimethylsiloxy-1-methoxy-2-methylpropene (7.0 gm, 0.0402M), xylene (1.0 gm), and tetrabutylammonium m-chlorobenzoate (400 μl of a 1.0M solution in acetonitrile). The flask is cooled to 10° C. Feed I consists of tetrahydrofuran (4.0 gm) and tetrabutylammonium m-chlorobenzoate (400 μl of a 1.0M solution). It is added over 50 minutes. Feed II is glycidyl methacrylate (17.3 gm, 0.122M). It is started simultaneously with the start of the feed I. Feed II is added over one minute. Feed III is methyl methacrylate (40.9 gm, 0.409M). Feed III is started 6 minutes after feed I has begun. Feed III is added over 30 minutes. The temperature of the flask rises to about 56.0° C. After feed I is completed the flask is cooled to 10° C. Feed IV is glycidyl methacrylate (17.0 gm, 0.120M). It is started 7 minutes after feed I is completed. Feed IV is added over 1 minute. At 80 minutes of total reaction time (22 minutes after feed IV is completed) methanol (10.0 gm) is added to the flask.

The molecular weight of the final polymer is number average molecular weight $\overline{M}_n = 2100$, weight average molecular weight $\overline{M}_w = 3900$, polydispersity $(D = \overline{M}_w/\overline{M}_n) = 1.86$ (theoretical Mn=1870). The conversion of all monomers is greater than 99.90%. The resin should be an ABA block polymer (GMA//MMA//GMA 3//10//3) with three epoxy groups on each end of the resin.

EXAMPLE 2 (GMA//EHMA//GMA 3//5//3)

(Mono-initiator, 3-feed)

A 250 ml round bottom flask, equipped with a mechanical stirrer, thermometer, and nitrogen inlet, is charged with tetrahydrofuran THF (75.6 gm), 1-trimethylsiloxy-1-methoxy-2-methylpropene (7.0 gm, 0.0402M), xylene (1.0 gm), and tetrabutylammonium m-chlorobenzoate (400 μl of a 1.0M solution in acetonitrile). The flask is cooled to 10° C. Feed I consists of tetrahydrofuran (4.0 gm) and tetrabutylammonium m-chlorobenzoate (400 μl of a 1.0M solution). It is added over 50 minutes. Feed II is glycidyl methacrylate (17.3 gm, 0.122M). It is started simultaneously with the start of the feed I. Feed II is added over one minute. Feed III is 2-ethylhexyl methacrylate (40.7 gm, 0.206M). Feed III is started 9 minutes after feed I has begun. Feed III is added over 30 minutes. The temperature of the flask rises to about 41.0° C. After feed I is completed the flask is cooled to 10° C. Feed IV is glycidyl methacrylate (17.1 gm, 0.120M). It is started 8 minutes after feed I is completed. Feed IV is added over 1 minute. At 70 minutes of total reaction time (11 minutes after feed IV is completed) methanol (10.0 gm) is added to the flask.

The molecular weight of the final polymer is $\overline{M}_n = 1800$, $\overline{M}_w = 3400$, $D = 1.89$ (theoretical Mn=1870).

The conversion of all monomers is greater than 99.99%. The resin should be an ABA block polymer (GMA//EHMA//GMA 3//5//3) with three epoxy groups on each end of the resin.

EXAMPLE 3 (GMA//MMA//GMA 4//40//4)

(Mono-initiator, 3-feed)

A 250 ml round bottom flask, equipped with a mechanical stirrer, thermometer, and nitrogen inlet, is charged with dimethoxyethane-glyme-(18.6 gm), 1-trimethylsiloxy-1-i-butoxy-2-methylpropene (2.1 gm, 0.0097M), and glycidyl methacrylate (5.6 gm, 0.0394M). The flask is cooled to 10° C. Tetrabutylammonium m-chlorobenzoate TBACB (200 μl of a 1.0M solution in acetonitrile) is injected into the flask. Feed I consists of glyme (3.0 gm) and tetrabutylammonium m-chlorobenzoate (200 μl of a 1.0M solution). It is started 10 minutes after the first injection of TBACB. It is added over 56 minutes. Feed II is methyl methacrylate (40.3 gm, 0.403M). It is started simultaneous with the start of the feed I. Feed II is added over 35 minutes. The temperature of the flask rises to about 59.0° C. After feed II is completed the flask is cooled to 10° C. Feed III is glycidyl methacrylate (5.9 gm, 0.0415M). Feed III is started 42 minutes after feed I has begun. Feed III is added in one minute. At 66 minutes of total reaction time (13 minutes after feed IV is completed) methanol (5.20 gm) and toluene (1.325) are added to the flask.

The molecular weight of the final polymer is $\overline{M}_n = 5300$, $\overline{M}_w = 6700$, $D = 1.27$ (theoretical Mn = 5200). The conversion of all monomers is greater than 99.99%. The resin should be an ABA block polymer (GMA//MMA//GMA 4//40//4) with four epoxy groups on each end of the resin.

EXAMPLE 4 (GMA//MMA//GMA 8//40//8)

(Mono-initiator, 3-feed)

A 250 ml round bottom flask, equipped with a mechanical stirrer, thermometer, and nitrogen inlet, is charged with dimethoxyethane (glyme) (17.5 gm), 1-trimethylsiloxy-1-i-butoxy-2-methylpropene (2.2 gm, 0.0102M), and glycidyl methacrylate (11.3 gm, 0.0796M). The flask is cooled to 10° C. Tetrabutylammonium m-chlorobenzoate (200 μl of a 1.0M solution in acetonitrile) is injected into the flask. Feed I consists of glyme (3.0 gm) and tetrabutylammonium m-chlorobenzoate (200 μl of a 1.0M solution). It is started 10 minutes after the first injection of Tetrabutylammonium m-chlorobenzoate. It is added over 56 minutes. Feed II is methyl methacrylate (40.2 gm, 0.402M). It is started simultaneously with the start of the feed I. Feed II is added over 35 minutes. The temperature of the flask rises to about 60.7° C. After feed II is completed the flask is cooled to 10° C. Feed III is glycidyl methacrylate (12.1 gm, 0.0852M). Feed III is started 42 minutes after feed I has begun. Feed III is added in one minute. At 66 minutes of total reaction time (13 minutes after feed IV is completed) methanol (5.20 gm) and toluene (1.118) are added to the flask.

The molecular weight of the final polymer is $\overline{M}_n = 7530$, $\overline{M}_w = 11,200$, $D = 1.49$ (theoretical Mn = 6200). The conversion of all monomers is greater than 99.99%. The resin should be an ABA block polymer (GMA//MMA//GMA 8//40//8) with eight epoxy groups on each end of the resin.

EXAMPLE 5 (GMA//BMA//GMA// 1//6//1)

Di-initiator, 2-feed

A 250 ml round bottomed flask, equipped with a mechanical stirrer, thermocouple, and nitrogen inlet is dried with a heat gun. The flask is then charged with tetrahydrofuran (THF 135 ml), 1,2-bis(1-trimethyl siloxy-2-methyl propeneoxy) ethane (24.0 gm, 57% ethyl acetate solution) and tetrabutylammonium chlorobenzoate (1.2 ml of a 1.02M acetonitrile solution). The flask is placed in an ice bath and cooled to 6° C. Feed I consists of tetrabutylammonium chlorobenzoate (1.2 ml of a 1.02M acetonitrile solution) and THF (3.8 ml). It is added over 40 minutes. Feed II is started simultaneously with Feed I, contains butyl methacrylate (57.0 ml, 0.359 moles) and is added over a total of 20 minutes. Feed III consists of glycidyl methacrylate (16.3 ml, 0.120 moles). It is added, all at once, 35 minutes after the start of Feed I. Temperature rises from 7° C. to 21° C. after addition of Feed III. The ice bath is removed 50 minutes after the start of Feed I. At 80 minutes of total reaction time water (3.2 ml) is added to the flask.

The molecular weight of the final product is $\overline{M}_n = 1520$, $\overline{M}_w = 2240$, $D = 1.48$ (theoretical Mn = 1334). The resin should be an ABA block polymer (GMA//BMA//GMA) with one epoxy group on each end of the chain.

EXAMPLE 6 (GMA//BMA//GMA 2//4//2)

(Di-initiator, 2-feed)

A 250 ml round bottomed flask, equipped with a mechanical stirrer, thermocouple, and nitrogen inlet is dried with a heat gun. The flask is then charged with tetrahydrofuran (THF 135 ml), 1,2-bis(1-trimethyl siloxy-2-methyl propeneoxy) ethane (24.0 gm, 57% ethyl acetate solution) and tetrabutylammonium chlorobenzoate (1.2 ml of a 1.02M acetonitrile solution). The flask is placed in an ice bath and cooled to 6° C. Feed I consists of tetrabutylammonium chlorobenzoate (1.2 ml of a 1.02M acetonitrile solution) and THF (4.0 ml). It is added over 40 minutes. Feed II is started simultaneously with Feed I, contains butyl methacrylate (38.1 ml, 0.240 moles) and is added over a total of 20 minutes. Feed III consists of glycidyl methacrylate (32.7 ml, 0.240). It is added, all at once, 35 minutes after the start of Feed I. Temperature rises from 7° C. to 35° C. after addition of Feed III. The ice bath is removed 50 minutes after the start of Feed I. At 80 minutes of total reaction time water (3.2 ml) is added to the flask.

The molecular weight of the final product is $\overline{M}_n = 1830$, $\overline{M}_w = 2970$, $D = 1.62$ (theoretical Mn = 1334). The resin should be an ABA block polymer (GMA//BMA//GMA) with two epoxy groups on each end of the chain.

EXAMPLE 7 (GMA//BMA//GMA 3//28//3)

(Di-initiator, 2-feed)

A 250 ml round bottomed flask, equipped with a mechanical stirrer, thermocouple, and nitrogen inlet is dried with a heat gun. The flaask is then charged with tetrahydrofuran (THF 135 ml), 1,2-bis(1-trimethylsiloxy-2-methyl propeneoxy) ethane (6.4 gm, 57% ethyl acetate solution) and tetrabutylammonium chlorobenzoate (0.3 ml of a 1.045M acetonitrile solution). The flask is placed in an ice bath and cooled to 12° C. Feed I consist of tetrabutylammonium chlorobenzoate (0.3 ml of a 1.045M Acetonitrile solution) and THF (4.7 ml). It is added over 40 minutes. Feed II is started simultaneously with Feed I, contains butyl methacrylate (71 ml, 0.447 moles) and is added over a total of 20 minutes. Feed III consists of glycidyl methacrylate (13.0 ml, 0.088 moles). It is added, all at once, 35 minutes after the start of Feed I. Temperature rises from 7° C. to 13° C. after addition of Feed III. The ice bath is removed 50 minutes after the start of Feed I. At 80 minutes of total reaction time water (1.0 ml) is added to the flask.

The molecular weight of the final product is $\overline{M}_n=7950$, $\overline{M}_w=10,900$, $D=1.37$ (theoretical Mn=5026). The resin should be an ABA block polymer (GMA//BMA//GMA) with three epoxy groups on each end of the chain.

EXAMPLE 8 (GMA//BMA//GMA 3//2//3)

(Di-initiator, 2-feed)

A 250 ml round bottomed flask, equipped with a mechanical stirrer, thermocouple, and nitrogen inlet is dried with a heat gun. The flask is then charged with tetrahydrofuran (THF 135 ml), 1,2-bis(1-trimethyl siloxy-2-methyl propeneoxy) ethane (24.1 gm, 57% ethyl acetate solution) and tetrabutylammonium chlorobenzoate (1.2 ml of a 1.045M acetonitrile solution). The flask is placed in an ice bath and cooled to 6° C. Feed I consists of tetrabutylammonium chlorobenzoate (1.2 ml of a 1.045M acetonitrile solution) and THF (4.3 ml). It is added over 40 minutes. Feed II is started simultaneously with Feed I, contains butyl methacrylate (19.0 ml, 0.120 moles) and is added over a total of 20 minutes. Feed III consists of glycidyl methacrylate (49.0 ml, 0.340 moles). It is added, all at once, 35 minutes after the start of Feed I. Temperature rises from 5° C. to 46° C. after addition of Feed III. The ice bath is removed 50 minutes after the start of Feed I. At 80 minutes of total reaction time water (3.2 ml) is added to the flask.

The molecular weight of the final product is $\overline{M}_n=2010$, $\overline{M}_w=4050$, $D=2.02$ (theoretical Mn=1334). The resin should be an ABA block polymer (GMA//BMA//GMA) with three epoxy groups on each end of the chain.

EXAMPLE 9 (GMA//BMA//GMA 3//8//3)

(Di-initiator, 2-feed)

A 1000 ml round bottomed flask, equipped with a mechanical stirrer, thermocouple, and nitrogen inlet is dried with a heat gun. The flask is then charged with tetrahydrofuran (THF 675 ml), 1,2-bis(1-trimethyl siloxy-2-methyl propeneoxy) ethane (73.6 gm, 57% ethyl acetate solution) and tetrabutylammonium chlorobenzoate (3.7 ml of a 1.045M acetonitrile solution). The flask is placed in an ice bath and cooled to 4° C. Feed I consists of tetrabutylammonium chlorobenzoate (3.7 ml of a 1.045M acetonitrile solution) and THF (6.7 ml). It is added over 40 minutes. Feed II is started simultaneously with Feed I, contains butyl methacrylate (232 ml, 1.70 moles) and is added over a total of 20 minutes. Feed III consists of glycidyl methacrylate (150 ml, 1.10 moles). It is added, all at once, 35 minutes after the start of Feed I. Temperature rises from 13° C. to 46° C. after addition of Feed III. The ice bath is removed 50 minutes after the start of Feed I. At 80 minutes of total reaction time water (10.0 ml) is added to the flask.

The molecular weight of the final product is $\overline{M}_n=3230$, $\overline{M}_w=4270$, $D=1.32$ (theorectical Mn=2186). The resin should be an ABA block polymer (GMA//BMA//GMA) with three epoxy groups on each end of the chain.

EXAMPLE 9A (Coating Made From Example 9)

The following is an example that shows how a GMA block polymer was used to make a coating. This polymer was blended with an anhydride containing acrylic polymer, applied, and cured at room temperature. The cure occurs between the epoxy groups and the anhydride.

The following compositions are prepared and then blended together to form an air dry enamel.

| INGREDIENTS | PARTS BY WEIGHT |
| --- | --- |
| GMA//BMA//GMA polymer (prepared in example 9) | 122.0 solution |
| Anhydride containing polymer (MMA/NBA/ITA-AN 18/55/27) 36% solids [MMA = methyl methacrylate] [NBA = butyl acrylate] [ITA-AN = itaconic anhyride] | 154.4 solution |
| Diazabicyloctane catalyst (Dabco) | 1.0 |
| Dimethylethanol amine | 1.0 |
| Toluene | 121.6 |
| Total | 400.0 |

The above composition was applied to a steel panel and allowed to cure at room temperature for one week. The film was clear, hard (145 rating in Perzod test), had good adhesion, and had a gel time of 33 hours.

EXAMPLE 9B (Coating made from Example 9)

The following is an example that shows how a GMA block polymer was used to prepare a coating and how that coating performed in an accelerated weathering test. The GMA polymer was cured with a diamine.

The following compositions are prepared and blended together to form an enamel that can be either air dried or cured at an elevated temperature.

| INGREDIENTS | PARTS BY WEIGHT | 100% SOLIDS |
| --- | --- | --- |
| GMA/BMA//GMA polymer (prepared in example 9) | 259.2 | 92.0 |
| isophorone diamine | 8.0 | 8.0 |
| benzyl alcohol | 33.9 | — |
| Resiflow Surfactant made by Mosanto | 13.4 | — |
| Total | 314.5 | 100.0 |

The above composition was applied to primed steel panels and either allowed to cure at room temperature for one week or cured for 60 minutes at 120° C. All panels were clear, hard, and had good adhesion.

The bake panels had a hardness of 3.2 knoops and an initial 60 degree gloss of 78.4. They were exposed on a QUV accelerated weatherometer. After 120 hours of QUV exposure their 60 degree gloss was 70.1. The room temperature cured panels had an initial 60 degree gloss of 77.6. After 120 hours of QUV exposure their 60 degree gloss was 74.1. These results indicate that the GMA coatings, cured either at room temperature or at an elevated bake are durable.

CONTROL TEST 1

(Control Coating Made From A Bisphenol A Epoxy)

The following is an example of a coating that uses a bisphenol A type of epoxy. It was used as a control in an accelerated weathering test. The bisphenol A epoxy polymer was cured with a diamine.

The following compositions are prepared and blended together to form an enamel that can be either air dried or cured at an elevated temperature.

| INGREDIENTS | PARTS BY WEIGHT | 100% SOLIDS |
| --- | --- | --- |
| DER 331 epoxy (a bisphenol A based epoxy) made by Dow Chemical | 69.1 | 69.1 |
| isophorone diamine | 30.1 | 30.1 |
| benzyl alcohol | 142.7 | — |
| "Resiflow" Surfactant | 14.3 | — |
| Total | 256.2 | 100.0 |

The above composition was applied to primed steel panels and either allowed to cure at room temperature for one week or cured for 60 minutes at 120° C. All panels were clear, hard, and had good adhesion.

The bake panels had a hardness of 3.7 knoops and an initial 60 degree gloss of 78.5. They were exposed on a QUV accelerated weatherometer. After 120 hours of QUV exposure their 60 degree glosss was 2.6. This indicates that the coating is not durable. The room temperature cured panels had an initial 60 degree gloss of 72.0. After 120 hours of QUV exposure their 60 degree gloss was 2.0. These results indicate that the bisphenol A-based coatings, cured either at room temperature or at an elevated bake have poorer durability than coatings based on the GMA block polymers.

EXAMPLE 10 (GMA//BMA//GMA 1//12//1)

(Di-initiator, 2-feed)

An 8 oz. glass bottle is dried in an oven and fitted with a serum cap. Inside is placed a magnetic stirring bar, a thermocouple, and nitrogen inlet. The bottle is then charged with toluene (33.7 ml), 1,2-bis(1-trimethyl siloxy-2-methyl propeneoxy) ethane (5.4 gm, 57% ethyl acetate solution) and tetrabutylammonium chlorobenzoate (0.2 ml of a 1.045M acetonitrile solution). The bottle is placed in an ice bath and cooled to 4° C. Feed I consists of tetrabutylammonium chlorobenzoate (0.2 ml of a 1.045M acetonitrile solution) and toluene (4.8 ml). It is added over 30 minutes. Feed II is started simultaneously with Feed I, contains butyl methacrylate (17.5 ml, 0.110 moles) and is added over a total of 10 minutes. Feed III consists of glycidyl methacrylate (2.5 ml, 0.018 moles). It is added, all at once, 25 minutes after the start of Feed I. Temperature rises from 7° C. to 10° C. after addition of Feed III. The ice bath is removed 40 minutes after the start of Feed I. At 50 minutes of total reaction time methanol (0.5 ml) is added to the bottle.

The molecular weight of the final product is $\overline{M}_n = 1690$, $\overline{M}_w = 2500$, $D = 1.48$ (theoretical Mn = 2186). The resin should be an ABA block polymer (GMA//BMA//GMA) with one epoxy group on each end of the chain.

EXAMPLE 11 (GMA//BMA//GMA 2//10//2)

(Di-initiator, 2-feed)

An 8 oz. glass bottle is dried in an oven and fitted with a serum cap. Inside is placed a magnetic stirring bar, a thermocouple, and nitrogen inlet. The bottle is then charged with toluene (33.7 ml), 1,2-bis(1-trimethyl siloxy-2-methyl propeneoxy) ethane (5.4 gm, 57% ethyl acetate solution) and tetrabutylammonium chlorobenzoate (0.2 ml of a 1.045M acetonitrile solution). The bottle is placed in an ice bath and cooled to 4° C. Feed I consists of tetrabutylammonium chlorobenzoate (0.2 ml of a 1.045M acetonitrile solution) and toluene (4.8 ml). It is added over 30 minutes. Feed II is started simultaneously with Feed I, contains butyl methacrylate (14.5 ml, 0.092 moles) and is added over a total of 10 minutes. Feed III consists of glycidyl methacrylate (5.0 ml, 0.037 moles). It is added, all at once, 25 minutes after the start of Feed I. Temperature rises from 6° C. to 13° C. after addition of Feed III. The ice bath is removed 40 minutes after the start of Feed I. At 50 minutes of total reaction time methanol (0.5 ml) is added to the bottle.

The molecular weight of the final product is $\overline{M}_n = 1900$, $\overline{M}_w = 3290$, $D = 1.73$ (theoretical Mn = 2186). The resin should be an ABA block polymer (GMA//BMA//GMA) with two epoxy groups on each end of the chain.

EXAMPLE 12 (GMA//MMA//GMA 4//40//4)

(Mono-initiator, 2-feed, coupling agent)

A 250 ml round bottom flask, equipped with a mechanical stirrer, thermometer, and nitrogen inlet, is charged with dimethoxyethane-glyme-(18.6 gm), 1-trimethylsiloxy-1-i-butoxy-2-methylpropene (2.1 gm, 0.0097M), and glycidyl methacrylate (5.6 gm, 0.0394M). The flask is cooled to 10° C. Tetrabutylammonium m-chlorobenzoate TBACB (200 μl of a 1.0M solution in acetonitrile) is injected into the flask. Feed I consists of glyme (3.0 gm) and tetrabutylammonium m-chlorobenzoate (200 μl of a 1.0M solution). It is started 10 minutes after the first injection of TBACB. It is added over 56 minutes. Feed II is methyl methacrylate (20.0 gm, 0.20M). It is started simultaneously with the start of the feed I. Feed II is added over 35 minutes. Twenty minutes after feed II is completed, diphenyl terephthalate (1.54 gm, 0.0048M) is added and the reaction is allowed to remain at room temperature overnight. This couples living polymer chains together. Then methanol (4.0 gm) is added. This should be an ABA' block polymer (GMA//MMA//GMA 4//40//4) with 4 epoxy groups on each end of the polymer chains.

EXAMPLE 13 (GMA//MMA//GMA 1//40//1)

(Epoxy initiator, 1-feed, coupling agent)

This Example demonstrates how to make an ABA block copolymer having a central segment comprised of methylmethacrylate and one epoxy group on each end of the polymer chain by using an initiator containing an oxirane group as a substituent in the activating moiety of the initiator. The activating moiety is comprised of 1-glycidoxy-2-methylpropene which upon initiation of the polymerization forms a single glycidyl methacrylate unit which remains as the first unit in the polymer chain. The initiator also contains a 1-trimethyl-siloxy initiator moiety which transfers to the other end of the growing polymer chain and remains living throughout the polymerization reaction, as known in the art.

A 250 ml round bottom flask, equipped with a mechanical stirrer, thermometer, and nitrogen inlet, is charged with tetrahydrofuran (18.6 gm), and 1-trimethylsiloxy-1-glycidoxy-2-methylpropene (2.16 gm, 0.010M). The flask is cooled to 10° C. Tetrabutylammonium m-chlorobenzoate (100 ul of a 1.0M solution in acetonitrile) is injected into the flask. Feed I consists of tetrahydrofuran (4.0 gm) and tetrabutylammonium m-chlorobenzoate (100 ul of a 1.0M solution in acetonitrile). It is started 10 minutes after the first injection of TBACB. Feed II is methyl methacrylate (20.0 gm, 0.20M). It is started simultaneously with Feed I and is added over 30 minutes. Twenty minutes after Feed II is completed, diphenyl terephthalate (1.08 gm, 0.005M) is added and the reaction is allowed to remain at room temperature overnight. This couples two of the living polymer chains together at their living ends so that the result should be an ABA block polymer (GMA//MMA//GMA 1//40//1) with one epoxy group on each end of every polymer chain.

We claim:

1. An improved process for the preparation of an ABA block copolymer having a center segment between two end segments, each end segment being an oxirane-containing acrylic or methacrylic moiety, said center segment being an acrylic or methacrylic moiety not containing oxirane groups, wherein the improvement comprises reacting the ingredients by group transfer polymerization using an initiator comprised of an activating moiety which contains an oxirane group substituent which remains at the non-living end of the polymer being formed and wherein the initiator is reacted with a monomer or monomers selected from the group consisting of acrylic and methacrylic monomers to first form polymer chains having a terminal oxirane group at one end of a chain and a living group at the other end, and then using a coupling agent to react two of said chains together at their living ends whereby an ABA copolymer is formed having an oxirane terminal group on each end.

2. The process of claim 1 wherein the activating moiety of the initiator is comprised of 1-glycidoxy-2-methylpropene and the monomer or monomers are selected from acrylic and methacrylic monomers.

3. The process of claim 2 wherein the monomer is methyl methacrylate.

4. The process of claim 1 wherein the coupling agent is diphenyl terephthalate.

5. The process of claim 1 wherein the initiator is 1-trimethylsiloxy-1-glycidoxy-2-methylpropene.

* * * * *